US009435311B2

(12) United States Patent
Snodgrass et al.

(10) Patent No.: US 9,435,311 B2
(45) Date of Patent: Sep. 6, 2016

(54) REGULATOR FLOW DAMPING

(71) Applicant: Woodward, Inc., Fort Collins, CO (US)

(72) Inventors: Brett J. Snodgrass, Byron, IL (US);
Paul J. Schaefer, Rockton, IL (US);
Brian K. Lawver, Rockford, IL (US)

(73) Assignee: Woodward, Inc., Fort Collins, CO (US)

( * ) Notice: Subject to any disclaimer, the term of this patent is extended or adjusted under 35 U.S.C. 154(b) by 292 days.

(21) Appl. No.: 14/272,085

(22) Filed: May 7, 2014

(65) Prior Publication Data

US 2015/0322910 A1 Nov. 12, 2015

(51) Int. Cl.
*F16K 47/08* (2006.01)
*F02M 69/54* (2006.01)
*F02C 7/232* (2006.01)
*F02C 9/26* (2006.01)

(52) U.S. Cl.
CPC .............. *F02M 69/54* (2013.01); *F02C 7/232* (2013.01); *F02C 9/263* (2013.01); *Y10T 137/0379* (2015.04); *Y10T 137/7801* (2015.04)

(58) Field of Classification Search
CPC ....... F02C 7/232; F02C 9/263; F02M 69/54; F02M 2200/30; F02M 2200/31; Y10T 137/7801; Y10T 137/0379
USPC ......... 137/489, 487, 601.13, 599.01, 599.11; 60/39.281, 494
See application file for complete search history.

(56) References Cited

U.S. PATENT DOCUMENTS

| 3,106,934 A | 10/1963 | Rogers et al. | |
|---|---|---|---|
| 3,426,784 A | 2/1969 | Vick | |
| 3,648,570 A | 3/1972 | Koch | |
| 3,946,551 A * | 3/1976 | Linebrink | F04B 17/003 417/202 |
| 4,117,857 A * | 10/1978 | Van De Mark | F02C 7/232 137/115.03 |
| 4,245,468 A * | 1/1981 | Fondacci | F02C 9/46 60/39.281 |
| 4,602,479 A | 7/1986 | Hansen | |
| 4,715,397 A | 12/1987 | Stearns | |
| 4,716,929 A | 1/1988 | Tomer | |

(Continued)

FOREIGN PATENT DOCUMENTS

| CN | 201661539 | 12/2010 |
|---|---|---|
| EP | 1047867 | 3/2003 |

(Continued)

OTHER PUBLICATIONS

International Search Report and Written Opinion of the International Searching Authority issued in International Application No. PCT/US2015/029198 on Aug. 17, 2015; 12 pages.

*Primary Examiner* — Kevin Murphy
*Assistant Examiner* — Minh Le
(74) *Attorney, Agent, or Firm* — Fish & Richardson P.C.

(57) ABSTRACT

The subject matter of this specification can be embodied in, among other things, a method that includes providing a fluid at a fluid inlet fluidically connected to an input fluid path, providing a fluid outlet fluidically connected to an outlet fluid path, fluidically connecting the inlet fluid path to the outlet fluid path through a valve, fluidically connecting the inlet fluid and the outlet fluid through a bypass fluid path in parallel with the valve, flowing the fluid from the inlet fluid path to the outlet fluid path through the valve and the bypass fluid path at a regulated fluid flow rate, restricting fluid flow in the bypass fluid path with a first orifice, restricting fluid flow in one of the fluid inlet path or the fluid outlet path with a second orifice, and providing the fluid at the fluid outlet at an outlet fluid flow rate.

16 Claims, 3 Drawing Sheets

(56) References Cited

U.S. PATENT DOCUMENTS

| | | | |
|---|---|---|---|
| 4,719,749 A | 1/1988 | Greune et al. | |
| 4,805,658 A | 2/1989 | Perkinson et al. | |
| 5,025,823 A * | 6/1991 | Stevenson | F16H 61/067 137/110 |
| 5,433,237 A * | 7/1995 | Kao | G05D 16/10 137/115.16 |
| 5,709,079 A | 1/1998 | Smith | |
| 5,896,737 A | 4/1999 | Dyer | |
| 6,189,312 B1 | 2/2001 | Smith | |
| 6,195,978 B1 | 3/2001 | Futa, Jr. | |
| 6,321,527 B1 | 11/2001 | Dyer et al. | |
| 6,381,946 B1 * | 5/2002 | Wernberg | F02C 9/263 60/39.281 |
| 6,401,446 B1 | 6/2002 | Gibbons | |
| 6,655,126 B2 * | 12/2003 | Walker | F02C 9/28 60/243 |
| 6,666,015 B2 | 12/2003 | Dyer | |
| 6,751,942 B2 | 6/2004 | Mahoney et al. | |
| 6,807,801 B2 | 10/2004 | McCarty | |
| 6,898,939 B2 | 5/2005 | Busch | |
| 6,988,356 B2 * | 1/2006 | Hodinot | F02C 9/38 60/39.281 |
| 7,007,452 B1 | 3/2006 | Baryshnikov et al. | |
| 7,178,335 B2 | 2/2007 | Bickley | |
| 7,587,900 B2 | 9/2009 | Shelby et al. | |
| 8,128,378 B2 | 3/2012 | Rowan et al. | |
| 8,348,630 B2 * | 1/2013 | Tysver | G05D 7/0688 417/213 |
| 2002/0184884 A1 | 12/2002 | McCarty | |
| 2005/0100447 A1 * | 5/2005 | Desai | F04B 1/26 417/220 |
| 2010/0257867 A1 | 10/2010 | Aurousseau et al. | |
| 2011/0023982 A1 | 2/2011 | Griffiths | |
| 2011/0253231 A1 | 10/2011 | Dore et al. | |
| 2012/0042657 A1 | 2/2012 | Hodinot et al. | |
| 2012/0159953 A1 | 6/2012 | Griffiths et al. | |
| 2012/0167594 A1 | 7/2012 | Poisson et al. | |
| 2012/0261000 A1 | 10/2012 | Futa et al. | |
| 2012/0325348 A1 | 12/2012 | Heitz et al. | |
| 2013/0042920 A1 | 2/2013 | Snodgrass et al. | |
| 2013/0186096 A1 | 7/2013 | Andre et al. | |
| 2015/0040990 A1 * | 2/2015 | Mathiesen | E21B 34/08 137/12 |
| 2015/0192073 A1 * | 7/2015 | Griffiths | F02C 7/22 60/734 |
| 2015/0226170 A1 * | 8/2015 | Snodgrass | F02C 9/263 137/12 |

FOREIGN PATENT DOCUMENTS

| | | |
|---|---|---|
| EP | 1727013 | 5/2010 |
| GB | 2305975 | 4/1997 |

* cited by examiner

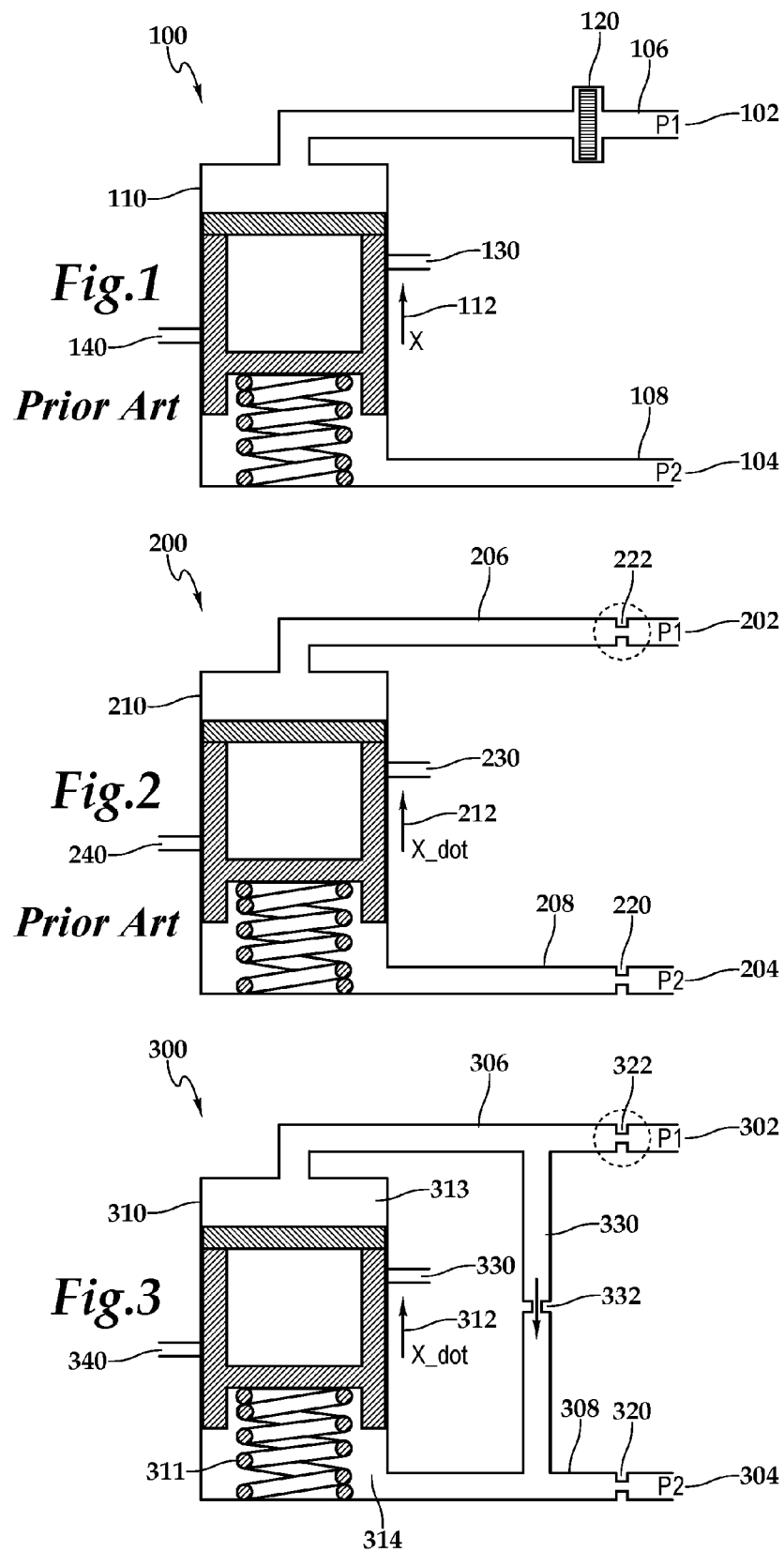

REGULATOR FLOW DAMPING

TECHNICAL FIELD

The concepts herein relate to fluid flow regulators and more particularly to fluid flow regulators with damped regulation responses.

BACKGROUND

Flow regulating valves are integral components to providing a constant flow rate of fluid as requested by an external command to a combustion chamber, regardless of the inlet flow at the flow regulating valve. Historically, flow regulating valves have been damped with either a laminar leak path or via orifices in non-flowing sense lines.

Laminar leak path damping can provide linear damping over the full range of valve velocities. However the damping is proportional to the kinematic viscosity of the fluid being regulated, therefore the damping is sensitive to temperature variations of the fluid media.

Non-flowing orifice damping exhibits less temperature sensitivity than valves using laminar leak path damping. However, non-flowing orifice damping is proportional to the square of valve velocity. As a result, the orifice provides no damping when the valve is stationary (e.g., valve velocity equal to zero), but can over-damp the valve during large disturbances.

SUMMARY

In general, this document describes fluid flow regulators.

In a first aspect, a fuel flow regulator system for regulating flow through a fuel delivery path includes a fuel flow regulator valve in the fuel delivery path operable to selectively provide a restriction in the fuel delivery path in response to a fuel fluid flow between a fluid inlet and a fluid outlet, a bypass fluid path fluidically connecting the fluid inlet and the fluid outlet in parallel with the regulator valve, a first orifice restricting the bypass fluid path, and a second orifice restricting one of the fluid inlet or the fluid outlet.

Various implementations can include some, all, or none of the following features. The second orifice can restrict the fluid outlet. The fluid flow regulator can include a third orifice restricting the fluid inlet. The first orifice can have a size selected based on a minimum fluid flow rate. The outlet fluid flow rate can be the sum of the minimum fluid flow rate and the regulated fluid flow rates. The second orifice can have a size selected based on a bypass path flow rate, and the outlet flow rate is the sum of the minimum fluid flow rate, the bypass path flow rate, and the regulated fluid flow rate. The bypass flow path can include a filter screen configured to resist the flow of ice or contaminant particle flow. The bypass flow path can include a heating element.

In a second aspect, a method of regulating fluid flow includes providing a fluid at a fluid inlet fluidically connected to an input fluid path, providing a fluid outlet fluidically connected to an outlet fluid path, fluidically connecting the inlet fluid path to the outlet fluid path through a valve, fluidically connecting the inlet fluid and the outlet fluid through a bypass fluid path in parallel with the valve, flowing the fluid from the inlet fluid path to the outlet fluid path through the valve and the bypass fluid path at a regulated fluid flow rate, restricting fluid flow in the bypass fluid path with a first orifice, restricting fluid flow in one of the fluid inlet path or the fluid outlet path with a second orifice, and providing the fluid at the fluid outlet at an outlet fluid flow rate.

Various implementations can include some, all, or none of the following features. The second orifice can restrict the fluid outlet. The fluid flow regulator can include a third orifice restricting the fluid inlet. The first orifice can have a size selected based on a minimum fluid flow rate. The outlet fluid flow rate can be the sum of the minimum fluid flow rate and the regulated fluid flow rates. The second orifice can have a size selected based on a bypass path flow rate, and the outlet flow rate is the sum of the minimum fluid flow rate, the bypass path flow rate, and the regulated fluid flow rate. The bypass flow path can include a filter screen configured to resist the flow of ice or contaminant particle flow. The bypass flow path can include a heating element.

The systems and techniques described here may provide one or more of the following advantages. First, a system can provide damping of the flow regulator that is independent of amplitude by using a flowing damping orifice damping arrangement. Second, the system can be arranged such that there are no additional pump draw requirements, thereby having no impact to pump sizing. Third, the system can implement larger diameter passages than other damping systems, thereby improving the resistance to contamination. Fourth, the system can have reduced leakage sensitivity. Fifth, the system can eliminate the need for one or two check valves that may be required when using prior damping arrangements.

The details of one or more implementations are set forth in the accompanying drawings and the description below. Other features and advantages will be apparent from the description and drawings, and from the claims.

DESCRIPTION OF DRAWINGS

FIGS. 1 and 2 are schematic diagrams of prior art fluid flow regulators.

FIG. 3 is a schematic diagram of an example fluid flow regulator.

DETAILED DESCRIPTION

Figure 4:
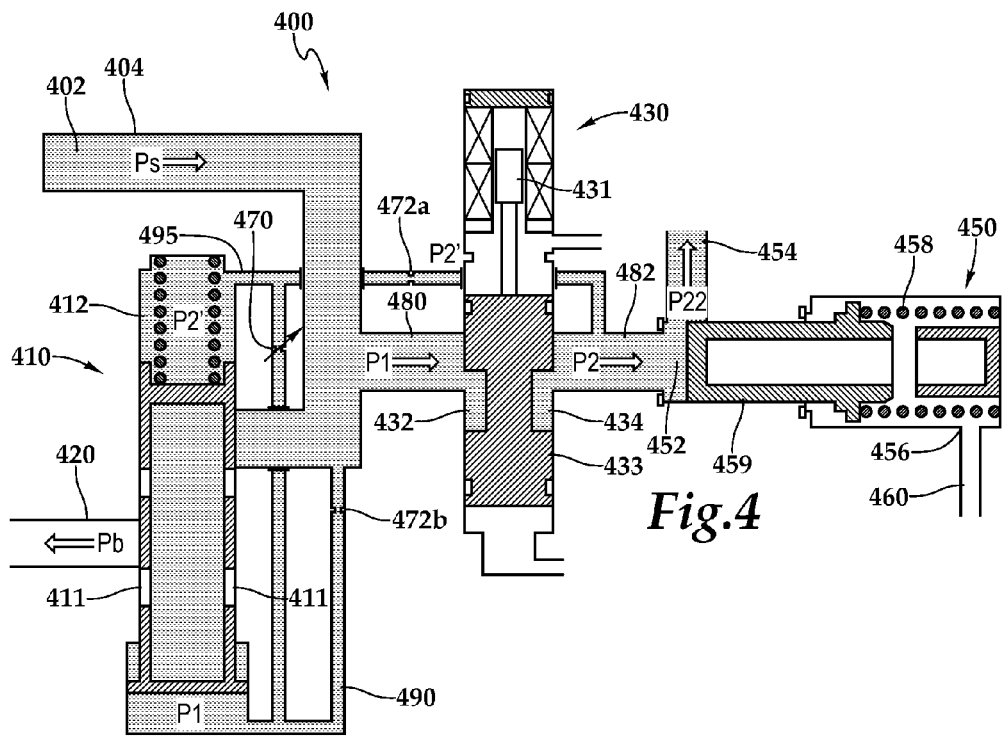
FIG. 4 is a schematic diagram of an example fluid delivery system that includes an example fluid flow regulator with damping.

This document describes systems and techniques for regulating fluid flow with a damped response. Flow regulating valves can maintain the flow of fluid provided at the inlet of the flow regulator. Two damping schemes used for flow regulator systems include the use of laminar leak path damping or orifices in non-flowing sense lines.

FIG. 1 is a schematic diagram of a prior art fluid flow regulator 100 that uses laminar leak path damping. The regulator 100 includes two distinct pressure signals at 102 and 104. The fluid at 102 is fluidically connected to fluid path 106, and the fluid at 104 is fluidically connected to fluid path 108.

The fluid path 106 is fluidically connected to the outlet fluid path 108 through a bypass valve 110 and a laminar damping orifice 120. The bypass valve 110 includes a number of ports (not shown) that fluidically connects the inlet fluid path 130 to the outlet fluid path 140. The bypass valve 110 exhibits a regulator velocity, generally represented by the arrow 112. The laminar damping orifice 120 restricts fluid flow from the fluid inlet 102 to the bypass valve 110. The laminar damping orifice 120 includes a close clearance gap through which fluid can flow in a damped manner.

Laminar leak path damping can provide linear damping over a substantial range of valve velocities. However, the damping is proportional to the kinematic viscosity of the fluid being regulated, therefore the damping is sensitive to temperature variations of the fluid media. At low regulator velocities 112 of the bypass valve 110, low flow is induced across the laminar damping orifice 120. The flow across laminar damping orifice 120 results in a differential pressure drop that is proportional to flow (e.g., linear). In addition, laminar flow is inversely proportional to fluid kinematic viscosity. Therefore, damping varies with the temperature of the fluid being flowed. For example, typical aircraft fuels and operational temperature ranges can result in fuel viscosity variations from 20.6 centistokes (−65 F JetA) to 0.4 centistokes (300 F JetA), resulting in temperature-induced damping variations of approximately 50×. Such levels of damping variation can be difficult to design for over an entire operating envelope of an aircraft engine. As such, the laminar leak path damping architecture of the regulator 100 may be seldom implemented with modern aircraft engine embodiments.

FIG. 2 is a schematic diagram of a prior art fluid flow regulator 200 that uses non-flowing orifice damping. The regulator 200 includes a fluid at 202 and a fluid at 204. The fluid at 202 is fluidically connected to a fluid path 206, and the fluid at 204 is fluidically connected to a fluid path 208.

The inlet fluid path 206 is fluidically connected to the outlet fluid path 208 through a bypass valve 210. The bypass valve 210 includes a number of ports (not shown) that fluidically connects the inlet fluid path 230 to the outlet fluid path 240. The bypass valve 210 exhibits a regulator velocity, generally represented by the arrow 212. A damping orifice 220 restricts fluid flow from the bypass valve 210 to the fluid outlet 204 along the outlet fluid path 208. In some embodiments, the fluid flow regulator 200 can also include a damping orifice 222 that restricts fluid flow from the fluid inlet 202 to the bypass valve 210.

Non-flowing orifice damping exhibits less temperature sensitivity than valves using laminar leak path damping. However, non-flowing orifice damping is proportional to the square of the regulator velocity 212. As a result, the orifice provides little to no damping when the bypass valve 210 is stationary (e.g., valve velocity 212 is equal to zero), but can over-damp the bypass valve 210 during large disturbances.

At low regulator velocities, low flow is induced across the damping orifices 220 and 222. The induced flow across the damping orifices 220 and 222 results in a differential pressure drop that is proportional to the square of flow (e.g., non-linear). In examples in which the orifices 220, 222 are appropriately sized (e.g., greater than about 0.020 inches diameter), the differential pressures generated by low regulator velocities may be negligible, resulting in little to no damping of the bypass valve 210. In addition, orifice flow is proportional to the square root of fuel specific gravity, and is substantially independent of fuel viscosity. For example, typical aircraft fuels and temperature ranges can result in fuel specific gravity from 0.873 (−65 F JetA) to 0.712 (300 F JetA), resulting in a damping variation due to temperature of approximately 1.1×.

In aircraft applications, space and weight can be limited commodities. Use of the pressure regulator 200 of FIG. 2 in such examples may allow high-frequency pressure oscillations in the fuel to go substantially undamped across the valve 210. For example, the operations of fuel injectors downstream of the pressure regulator 200 may introduce oscillations that can back-propagate and cause problems with equipment upstream from the pressure regulator 200 (e.g., noisy sensor readings, damage to fuel pumps). In another example, oscillations introduced upstream of the pressure regulator 200 (e.g., by fuel pumps, vibration from the engine) can propagate to and interfere with the function of equipment downstream from the pressure regulator (e.g., fuel injectors).

FIG. 3 is a schematic diagram of an example fluid flow regulator 300. The regulator 300 includes a fluid at 302 and a fluid at 304. The fluid at 302 is fluidically connected to an inlet fluid path 306, and the fluid at 304 is fluidically connected to an outlet fluid path 308.

A fluid with a flow to be regulated is provided at the fluid inlet 302 of the inlet fluid path 306. The inlet fluid path 306 is fluidically connected to the outlet fluid path 308 through a bypass valve 310. The bypass valve 310 includes a number of ports (not shown) that fluidically connects the inlet fluid path 330 to the outlet fluid path 340. A spring 311 urges the valve 310 toward a position that restricts or blocks fluid flow between the inlet fluid path 330 and the outlet fluid path 340. The valve 310 is responsive to changes in pressure differential 313 and 314 across it. In general, as pressure at the inlet fluid path 306 decreases, the bias force of the spring 311 urges the valve 310 toward a position that decreases allowable flow area between inlet fluid path 330 and the outlet fluid path 340. Decreasing the allowable flow area of bypass valve 310 also decreases the rate of flow from the inlet fluid path 330 to the outlet fluid path 340. The flow rate remains approximately at a specified level even though pressure at the valve 310 varies.

The bypass valve 310 exhibits a regulator velocity, generally represented by the arrow 312. A damping orifice 320 restricts fluid flow from the bypass valve 310 to the fluid outlet 304 along the outlet fluid path 308. In some embodiments, the fluid flow regulator 300 can also include a damping orifice 322 that restricts fluid flow from the fluid inlet 302 to the bypass valve 310.

A bypass fluid path 330 fluidically connects the inlet fluid path 306 to the outlet fluid path 308 in parallel with the bypass valve 310. The bypass flow path 330 includes a minimum flow orifice 332 that restricts fluid flow from the fluid inlet path 306 to the fluid outlet path 308. In some embodiments, the minimum flow orifice 332 can be sized based on a predetermined minimum fluid flow.

The regulator 300 maintains the advantage of temperature insensitivity similar to the non-flowing orifice damping design of the example regulator 200 of FIG. 2, but also provides linear damping similar to that provided by the example regulator 100 of FIG. 1. By using the configuration of the example regulator 300, the regulator has the same damping when stationary as during large transients. In the example regulator 300, the minimum flow orifice 332 converts the damping orifices 322 and 320 of the bypass valve 310 from non-flowing orifices to flowing orifices. As a result, damping of the bypass valve 310 becomes less amplitude dependent, yet leakage is not impacted.

Given the flowing orifice configuration of the example regulator 300, there exists a continuous, non-zero flow across the damping orifices of the bypass valve 310 and the minimum flow orifice 332. The continuous flow across the damping orifices of the bypass valve 310 results in a differential pressure drop induced across the damping orifices, which serves as a mechanism for damping at low valve velocities (312) as well as high valve velocities (312). Similar to the non-flowing orifice configuration of the example regulator 200, the flowing orifice configuration of the regulator 300 is insensitive to fluid viscosity variation due to temperature changes.

Additionally, the flowing orifice configuration of the example regulator 300 has a larger diameter damping orifice(s) than is appropriate to provide the similar levels of bypass damping in regulators that implement a non-flowing orifice configuration. In some implementations, the configuration of the regulator 300 can provide a number of advantages over the damping schemes implemented by the regulators 100 and 200. For example, the relatively larger damping orifices of the regulator 300 can provide relatively improved contamination resistance. In another example, the regulator 300 can exhibit relatively reduced leakage sensitivity since small amounts of bypass leakage, which is typically temperature dependent, has been known to bias the pressure differential setting of bypass valves, resulting in fuel flow errors. The configuration of the regulator 300 reduces this leakage sensitivity. In another example, some other regulator designs require the use of check valves in parallel to the relatively smaller bypass orifices, resulting in added weight and cost. Such check valves are not needed in the configuration of the regulator 300.

FIG. 4 is a schematic diagram of an example fluid delivery system 400 that includes fluid flow regulator damping, such as that provided by the example regulator 300 of FIG. 3. The system 400 includes a bypass valve 410, a metering valve 430, and a pressurizing valve 450 (e.g., pressure regulator). In some implementations, the system 400 can regulate fuel flow to an aircraft engine. In general, a fluid 402 (e.g., fuel) is provided at a fluid inlet 404. The fluid flows to a meter inlet 432 of the metering valve 430, and out from a meter outlet 434 to a pressurizing valve inlet 452 of the pressurizing valve 450.

The metering valve 430 is responsive to an external servo valve (not shown). The servovalve is coupled to actuate plunger 433, metering valve plunger position is communicated to an electronic control via a position feedback device 431. As the metering valve moves, a fluid path between a valve inlet 480 and a valve outlet 482 is selectively opened and closed. In use, the metering valve 430 can be actuated to adjust a rate of fluid flow at the valve outlet 482.

The bypass valve 410 includes a collection of ports 411. The bypass valve is actuated in response to the difference in fluid pressure developed in fluid conduit 490 and 495. Fluid conduit 490 can be described as fluid pressure in a fluid path between a minimum flow orifice 470 and a damping orifice 472b. Fluid conduit 495 can be described as fluid pressure in a fluid path between a minimum flow orifice 470 and a damping orifice 472a. When force exerted on the bypass valve 410 by the pressure differential in fluid conduit 490 and 495 is not sufficient to overcome the force provided by a spring 412, the bypass valve closes and restricts flow of the fluid 402 to an outlet 420. As the force exerted on the bypass valve 410 by the pressure differential in the fluid conduit 490 and 495 exceeds the opposing force, the valve 410 opens and allows flow to pass to the outlet 420.

The pressurizing valve 450 includes a spring 458 and plunger 459. The spring 458 and a force provided by the pressure of the fluid 460 applied at the input 456 biases the plunger 459 into the fluid flow between the valve outlet 482 and the outlet 454. The pressurizing valve 450 regulates the pressure of the fluid 402 at an inlet 452 in response to the pressure of a fluid 460 applied at an input 456 and a spring force 458. In some embodiments, the bypass valve 410 can be the bypass valve 310.

In use, the bypass valve 410 maintains a substantially constant differential pressure across the metering window of the metering valve 430. The metering valve 430 holds a metering port window that corresponds to the desired flow of the fluid 454 (e.g., a desired engine burn flow) in response to an input signal (e.g., from an engine controller or pilot input). The pressurizing valve 450 maintains at least a predetermined minimum fluidic pressure used to provide fluidic force margins for the metering valve 430 and internal or external actuation systems.

The example system 400 also includes the minimum flow orifice 470, the damping orifice 472a, and a damping orifice 472b. The orifices 470, 472a, and 472b restrict a bypass fluid flow path that bypasses the metering valve 430. The bypass fluid flow path extends from the inlet 404 and/or the valve inlet 480, through a damping orifice 472b, along the fluid conduit 490, through the minimum flow orifice 470, along fluid conduit 495, through a damping orifice 472a, to the valve outlet 482. The minimum flow orifice 470, which in some embodiments can be the minimum flow orifice 332 of FIG. 3, can be adjusted to calibrate for low fluid (e.g., fuel) flow requirements. In some embodiments, the minimum flow orifice 470 can be sized based on a predetermined minimum fluid flow to be passed through the bypass fluid flow path. In some embodiments, the minimum flow orifice 470 can be an adjustable orifice.

In use, the minimum flow orifice 470 continuously permits a specified amount of the fluid 402 to flow along a fluid path extending from the valve inlet 480 to the valve outlet 482, bypassing the fluid path provided by the metering valve 430. The two damping orifices 472a and 472b, which in some embodiments can be the damping orifices 320 and 322, are positioned in a series circuit with the minimum flow orifice 470. As such, all the fluid 402 that is passed by the minimum flow orifice 470 also passes through the damping orifices 472a and 472b. In some embodiments, the fluid flow rate at the valve outlet 482 can be the sum of the minimum fluid flow through the minimum flow orifice 470 and the regulated fluid flow rate through the metering valve 430.

The portion of the fluid 402 bypassing the metering valve 430 flows from the fluid inlet 404 (and the valve inlet 480, which is at the same pressure as the fluid inlet 402) through the damping orifice 472b, to a fluid conduit 490, to the minimum flow orifice 470, through the damping orifice 472a, and to the valve outlet 482. The flow remains substantially continuous at a specified flow rate, except for displacement flow provided by the bypass valve 410 which will add to or subtract from the described flow path. In some implementations, displacement flow from the bypass valve 410 can be relatively low compared to metering flow levels, and in cases can be ignored.

Figure 5:
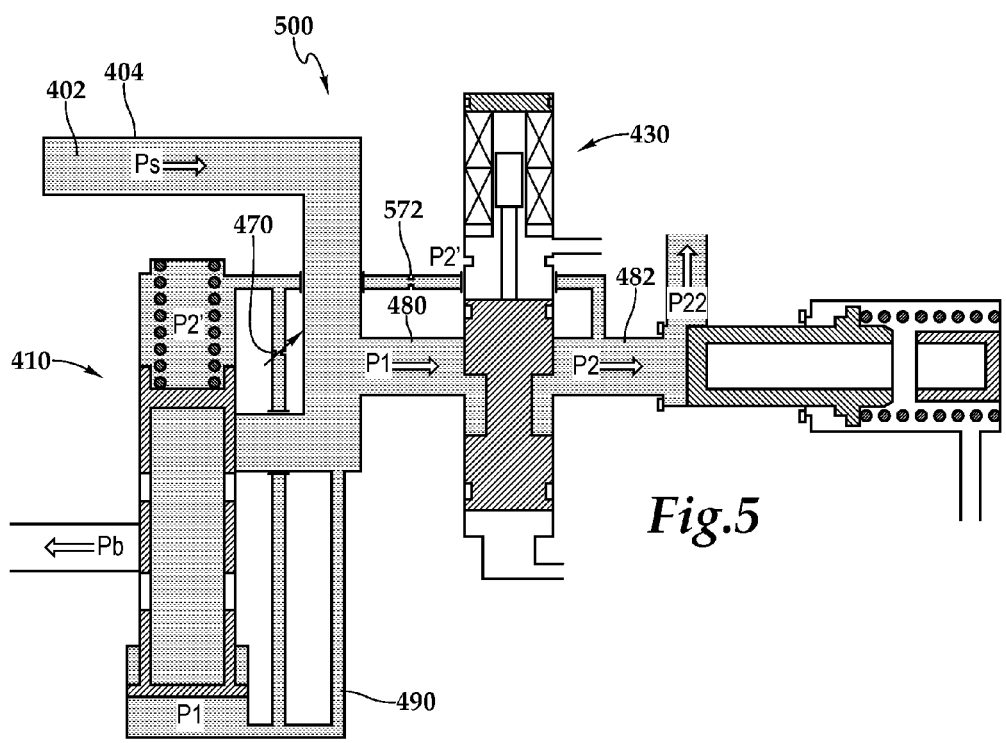
FIG. 5 is a schematic diagram of another example fluid delivery system that includes another example fluid flow regulator with damping.

FIG. 5 is a schematic diagram of an example fluid delivery system 500 that includes fluid flow regulator damping. The system 500 is similar to the example system 400 of FIG. 4, except that the two damping orifices 472a and 472b are reduced to a single damping orifice 572 along the bypass fluid flow path. Given this architecture, the fluid 402 flows from the fluid inlet 404 (and the valve inlet 480, which is at the same pressure as the fluid inlet 404) through the fluid conduit 490, to the minimum flow orifice 470, and to the valve outlet 482. In some implementations, the configuration shown in FIG. 5 may be used in an engine fuel delivery application.

In some implementations, the configuration of the system 500 simplifies the configuration of the system 400, eliminating the need to install and account for tolerance variations that may be associated with the damping orifice 472*b*. In some implementations, the configuration of the system 500 can cause the minimum flow orifice 470 to provide a protective filtering benefit to the damping orifice 572. In some embodiments, the fluid flow rate at the valve outlet 482 can be the sum of the minimum fluid flow through the minimum flow orifice 470 and the regulated fluid flow rate through the metering valve 430.

Figure 6:
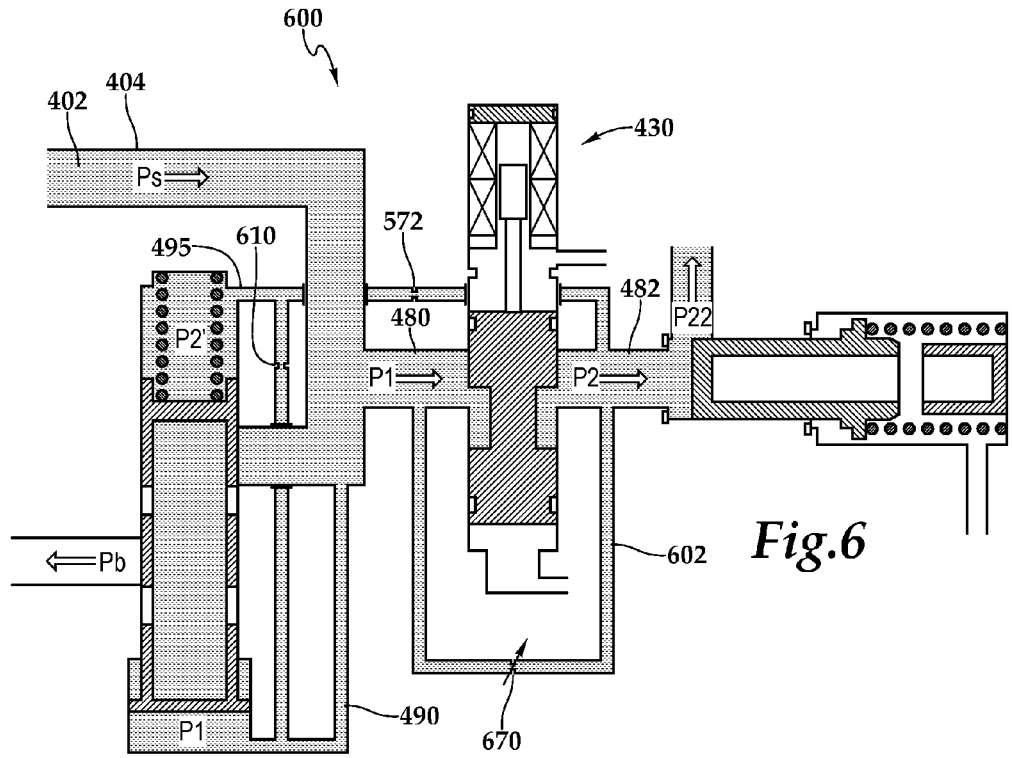
FIG. 6 is a schematic diagram of another example fluid delivery system that includes another example fluid flow regulator with damping.

FIG. 6 is a schematic diagram of an example fluid delivery system 600 that includes fluid flow regulator damping. The system 600 is similar to the example system 500 of FIG. 5, except that a minimum flow circuit 602 fluidically connects the valve inlet 480 to the valve outlet 482 in parallel with the metering valve 430 and the bypass fluid flow path 490. A minimum flow orifice 670 is included in the minimum flow circuit 602. Compared to the system 500, the system 600 also replaces the minimum flow orifice 470 of the system 500 with a flow limiter orifice 610. In some implementations, the configuration shown in FIG. 6 may be used in an engine fuel delivery application. In some embodiments, the minimum flow orifice 670 can be an adjustable flow orifice.

Given this architecture, the fluid 402 flows from the fluid inlet 404 (and the valve inlet 480, which is at the same pressure as the fluid inlet 404) through the fluid conduit 490, to the flow limiter orifice 610, through flow conduit 495, through the damping orifice 572, and to the valve outlet 482, and the minimum flow circuit flows from the valve inlet 480, through the minimum flow orifice 670, to the valve outlet 482. In some embodiments, the fluid flow rate at the valve outlet 482 can be the sum of the minimum fluid flow through the minimum flow orifice 670 and the damping flow circuit 490 and the regulated fluid flow rate through the metering valve 430. In some implementations, the configuration of the system 600 can cause calibration of the minimum flow orifice 670 to have little or no impact upon the damping performance of the bypass system.

Figure 7:
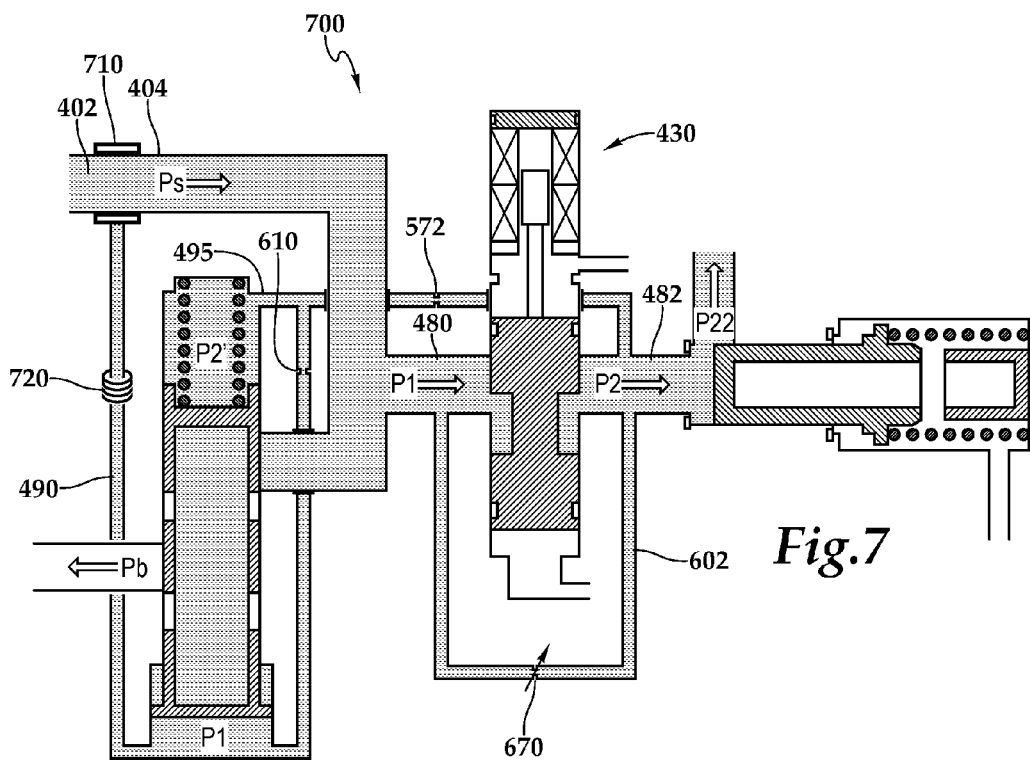
FIG. 7 is a schematic diagram of another example fluid delivery system that includes another example fluid flow regulator with damping.

FIG. 7 is a schematic diagram of an example fluid delivery system 700 that includes fluid flow regulator damping. The system 700 is similar to the example system 600 of FIG. 6, except that flow conduit 490 includes additional features to prevent icing of the damping flow circuit 490, such as a wash screen assembly 710 and a fuel heating element 720. The wash screen assembly 710 is resistant to heavy contamination as well as large quantities of ice, and the fuel heating element 720 provides fuel temperatures above freezing to preventing ice crystals from building up on the critical features of the damping circuit. In some implementations, the configuration shown in FIG. 7 may be used in an engine fuel delivery application. In some embodiments, the minimum flow orifice 670 can be an adjustable flow orifice.

Given this architecture, the fluid 402 flows from the fluid inlet 404 through wash screen 710, through the heating element 720, thru the fluid conduit 490, to the flow limiter orifice 610, through flow conduit 495, through the damping orifice 572, and to the valve outlet 482, and the minimum flow circuit flows from the valve inlet 480, through the minimum flow orifice 670, to the valve outlet 482. In some embodiments, the fluid flow rate at the valve outlet 482 can be the sum of the minimum fluid flow through the minimum flow orifice 670 and the damping flow circuit 490 and the regulated fluid flow rate through the metering valve 430. In some implementations, the configuration of the system 700 can cause calibration of the minimum flow orifice 670 to have no impact upon the damping performance of the bypass system.

The architecture of FIG. 7 provides the greatest protection for the damping circuit via the wash screen assembly 710 and the heating element 720. The wash screen assembly 710 is positioned in flow path 402 such that the large majority of fluid flow passes down the center of the wash screen assembly 710 and through to the valve inlet 480. Only a small percentage of flow passes to conduit 490, thereby providing a continuous washing of the filter media to prevent contamination and ice buildup. The heating element 720 is exposed only to the damping flow circuit flow, and therefore can be sized accordingly. The heating element 720 may be of various types, including but not limited to electrical, fluid heat transfer, or mechanical. In some embodiments, the fluid conduit 490 may be split to provide washed and/or heated fluid to other features within the system 700.

Although a few implementations have been described in detail above, other modifications are possible. For example, logic flows do not require the particular order described, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A fuel flow regulator system for regulating flow, comprising:
   a fuel delivery path operable to provide a regulated fuel fluid flow between a fuel inlet and a fuel outlet;
   a fuel bypass valve in the fuel delivery path operable to selectively provide a restriction in the fuel delivery path in response to the pressures of the fuel inlet and the fuel outlet of the regulated fuel fluid flow, wherein the bypass valve is fluidically connected to a fluid inlet path fluidically connected with the fuel inlet and a fluid outlet path fluidically connected with the fuel outlet;
   a bypass fluid path fluidically connecting the fluid inlet path and the fluid outlet path and parallel with the fuel bypass valve;
   a first restricting orifice in the bypass fluid path; and
   a second restricting orifice in one of the fluid inlet path or the fluid outlet path.

2. The fuel flow regulator system of claim 1, wherein the second restricting orifice restricts the fluid outlet path.

3. The fuel flow regulator system of claim 2, further comprising a third restricting orifice in the fluid inlet path.

4. The fuel flow regulator system of claim 1, wherein the first restricting orifice has a size selected based on a minimum fluid flow rate.

5. The fuel flow regulator system of claim 4, wherein the outlet fluid flow rate is the sum of the minimum fluid flow rate and the regulated fluid flow rate.

6. The fuel flow regulator system of claim 4, wherein the second restricting orifice has a size selected based on a bypass path flow rate, and the outlet flow rate is the sum of the minimum fluid flow rate, the bypass path flow rate, and the regulated fluid flow rate.

7. The fuel flow regulator system of claim 1, wherein the fluid inlet path further comprises a filter screen configured to resist the flow of ice or contaminant particle flow.

8. The fuel flow regulator system of claim 1, wherein the fluid inlet path further comprises a heating element.

9. A method of regulating fluid flow comprising:
providing a regulated fluid flow between a fluid inlet and a fluid outlet;
providing an inlet fluid path fluidically connected to the fluid inlet;
providing an outlet fluid path fluidically connected to the fluid outlet;
fluidically connecting the inlet fluid path and the outlet fluid path to a bypass valve in the fluid path;
fluidically connecting the inlet fluid path and the outlet fluid path through a bypass fluid path parallel with the bypass valve;
operating the bypass valve in response to the pressures of the fluid inlet and the fluid outlet to provide a restriction in the fluid path;
restricting fluid flow in the bypass fluid path with a first restricting orifice;
restricting fluid flow in one of the inlet fluid path or the outlet fluid path with a second restricting orifice; and
providing the fluid at the fluid outlet at an outlet fluid flow rate.

10. The method of claim 9, wherein the second restricting orifice restricts the outlet fluid path.

11. The method of claim 10, further comprising a third restricting orifice restricting the inlet fluid path.

12. The method of claim 9, wherein the first restricting orifice has a size selected based on a minimum fluid flow rate.

13. The method of claim 12, wherein the outlet fluid flow rate is the sum of the minimum fluid flow rate and the regulated fluid flow rates.

14. The method of claim 12, wherein the second restricting orifice has a size selected based on a bypass path flow rate, and the outlet fluid flow rate is the sum of the minimum fluid flow rate, the bypass path flow rate, and the regulated fluid flow rate.

15. The method claim 9, wherein the inlet fluid path further comprises a filter screen configured to resist the flow of ice or contaminant particle flow.

16. The method claim 9, wherein the inlet fluid path further comprises a heating element.

* * * * *

UNITED STATES PATENT AND TRADEMARK OFFICE
CERTIFICATE OF CORRECTION

PATENT NO. : 9,435,311 B2  
APPLICATION NO. : 14/272085  
DATED : September 6, 2016  
INVENTOR(S) : Brett J. Snodgrass, Paul J. Schaefer and Brian K. Lawver Page 1 of 1

It is certified that error appears in the above-identified patent and that said Letters Patent is hereby corrected as shown below:

In the Claims

Column 10, Line 18, after "method", insert -- of --

Column 10, Line 21, after "method", insert -- of --

Signed and Sealed this  
Twentieth Day of December, 2016

Michelle K. Lee  
*Director of the United States Patent and Trademark Office*